July 28, 1931.  A. E. DRISSNER  1,816,571
TOOL SLIDE OR REAMING ATTACHMENT
Filed Oct. 4, 1928  2 Sheets-Sheet 1
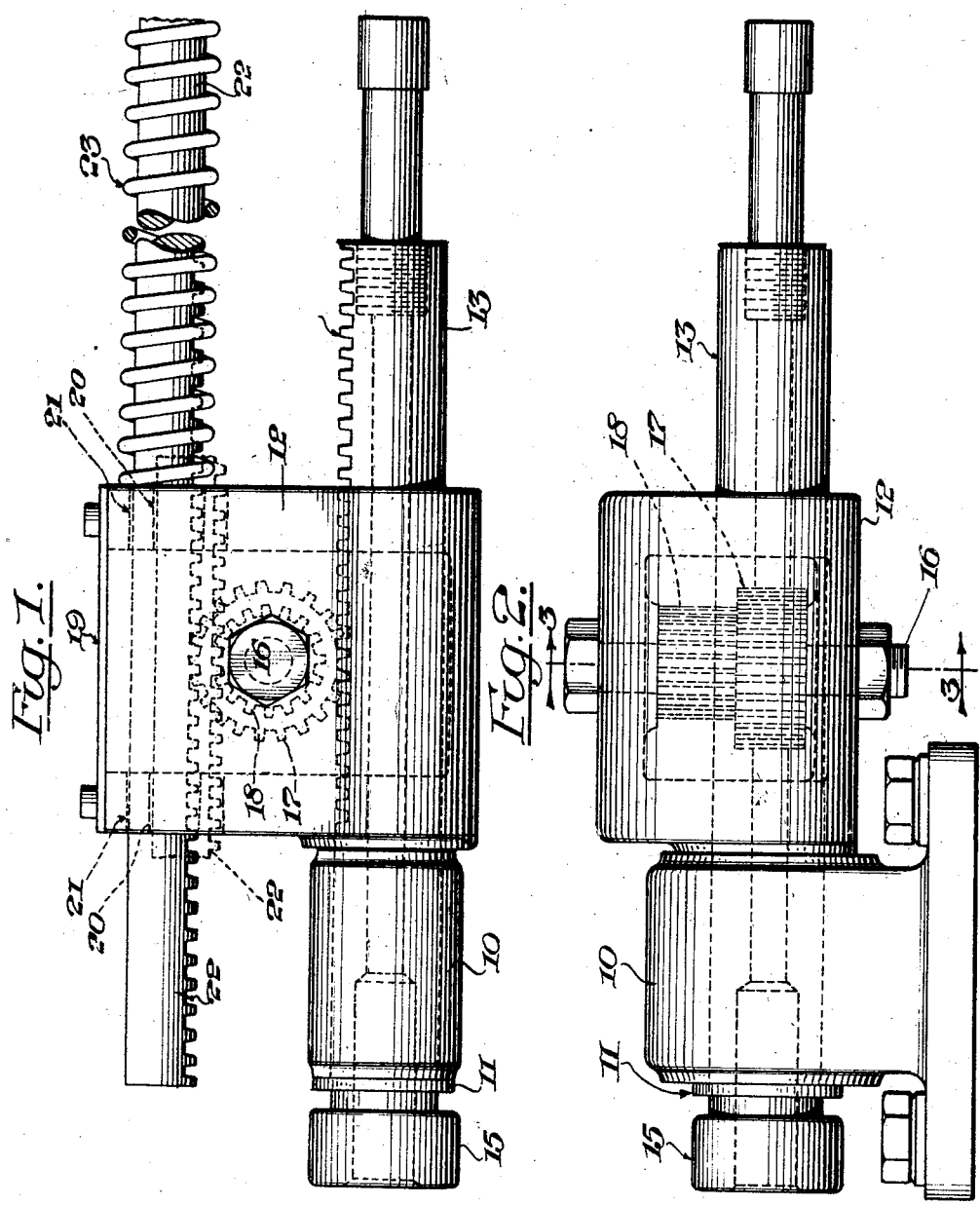
Inventor
Alfred E. Drissner
by his Attorney

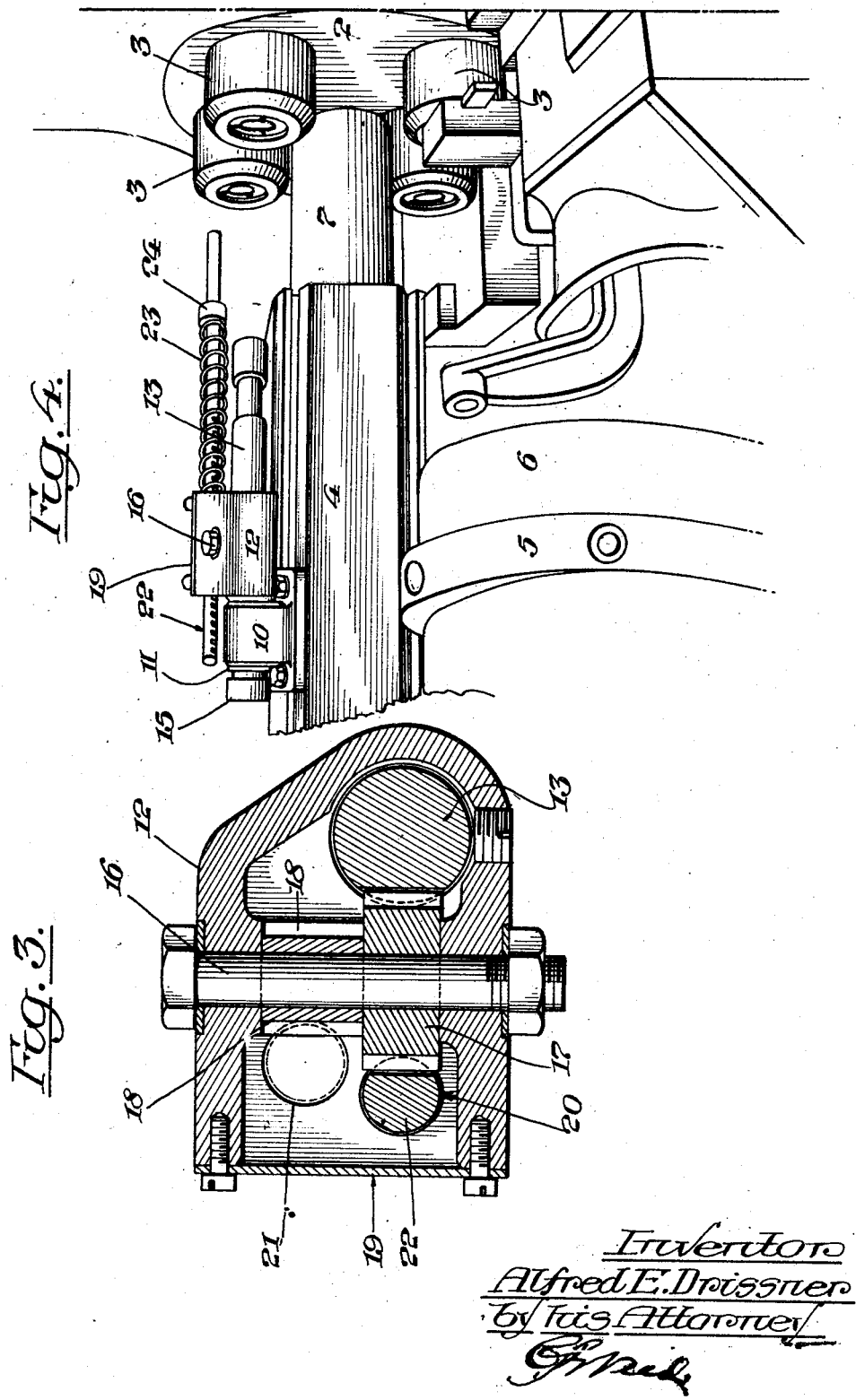

Patented July 28, 1931

1,816,571

UNITED STATES PATENT OFFICE

ALFRED E. DRISSNER, OF CLEVELAND, OHIO, ASSIGNOR TO THE NATIONAL ACME COMPANY, OF CLEVELAND, OHIO, A CORPORATION OF OHIO

TOOL SLIDE OR REAMING ATTACHMENT

Application filed October 4, 1928. Serial No. 310,317.

This invention relates to a tool slide or fixture attachment particularly adapted for use with reamers, by means of which the speed or feed of the tool may be accelerated or the length of feed of the tool increased,—the invention being particularly adapted for use with metal working machines, such as automatic screw or multiple spindle machines wherein a tool slide is used carrying a series of tools adapted to operate at the same time upon the work held in the several work spindles of an indexible turret,—an object of the invention being to provide an improved, simple, efficient, economical and durable means for increasing the length of the working stroke or accelerating the feed of some one or more of the working tools, the invention being an improvement upon that shown and described in Patent No. 1,522,124, dated January 6, 1925, and owned by The National Acme Company, the assignee of the present invention.

The particular object of the present invention is to improve the structure shown and described in the said patent, whereby by one and the same mechanism, without any material changes thereof, a reamer or other tool may have either a two-to-one movement or a three-to-one movement or any other suitable ratio, by merely changing the position of a single operating rack or varying the number of teeth in one of the pinions operated by the said rack.

In the metal working machines of the class described, the several end working tools carried by the main tool slide simultaneously approach the work carried by the work spindles of an indexible turret and at the same rate of feed, regardless of their size or nature of the cut or work which they are to perform,—so that the working stroke or feed of these tools is no greater than the travel of the tool slide, the feed and stroke thus being limited to the slowest and longest single cut. It is, however, often advantageous, not only to increase either the speed or feed of one of the tool slide tools, but to increase it at different ratios, this being particularly true in the case of reamers, which make a smoother and truer cut when moving or traveling at about twice or three times the feed of a drill of corresponding diameter; and, therefore, the object of the present invention is to accomplish this result by a simple means and by means of an attachment that is readily adapted to the standard tool slide.

In the drawings accompanying and forming a part of this specification—

Figure 1 is a plan view illustrating the present improved attachment;

Fig. 2 is a side elevation thereof;

Fig. 3 is a cross-sectional view taken on line 3—3, Figure 2, and

Fig. 4 is a perspective view illustrating one form of metal working machine with this attachment applied thereto.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the present instance the attachment is shown applied to a multiple spindle screw machine having an indexible turret 2 carrying the usual rotary work spindles 3 and having a reciprocating main tool slide 4 shifted by means of a cam 5 on a cam drum 6 carried by a suitable cam shaft, the main tool slide being supported by a suitable shaft or bearing 7 formed as a part of or projecting into the work cylinder 2. The main tool slide 4 is suitably formed to carry the necessary end working tools for engaging the work carried by the work spindles 3. Bolted to the main tool slide 4 is a tool holder 10 for the reception of an extended portion or bushing 11 of a bracket 12, which bracket is suitably bored to receive, together with the bushing 11, a tool holder slide in the form of a rod or member 13 bored at its forward end for the reception of a suitable working tool and provided with rack teeth 14 along the inner side face thereof,—it being obvious, of course, that the rod 13 may be provided with any suitable tool holding means or chuck for holding the working tool. This supplemental slide or rod 13 is provided with a gauge collar 15 at its rear end which is adjustable as desired. The bracket 12 is in the form of a housing (see Fig. 3) carrying at one side thereof the rack-formed tool holder rod 13. Carried by a suitable vertical bolt 16 passing centrally through this housing is a pair of gears 17 and 18 of different diameters, but suitably fastened or keyed together, the lower one of which, as 17, is in mesh with the rack teeth of the tool holder rod 13. At the opposite side of the housing, which is closed by a detachable plate 19, the housing has each end wall provided with a pair of openings 20 and 21 located one above the other for the reception of a detachable rack bar 22. When this rack bar is located in the lower pair of openings 20, it is in position to engage the gear 17 and thereby give, in the present instance, a two-to-one movement to the tool holder slide as compared with the movement of the main tool slide 4. When, however, this rack bar is withdrawn from its position engaging the gear 17 and is inserted in the upper pair of openings 21 and in position to engage the pinion 18, a three-to-one movement is imparted to the supplemental tool slide, and any other ratio of movement may be given by merely changing the pinion 18 and the size of the openings 21. On this rack bar 22 is a spring 23 located between a collar 24 and the bracket 12, by means of which the tool may be returned to its normal position.

In the operation of this improved attachment, the rack bar 22 is suitably adjusted to have its forward end in position to strike some suitable stop or fixed part of the machine, such as the cylinder 2, at a predetermined time, when the main tool slide 4 carrying the end working tools is shifted forwardly by the cam 5. Further forward movement of the rack bar 22 is thus stopped, so that, while the main tool slide 4 continues to move forward, the rack bar will cause that gear with which it is in mesh to rotate, thus causing the supplemental tool holder slide or rod 13, by reason of its rack-teeth engagement with the gear 17, to move forward at the desired feed and length of movement to engage the work; and in the present instance, when the rack bar 22 engages with the gear 17, the tool will be shifted at twice the speed of the main tool slide. When a different or greater speed is desired, the rack bar is detached from the position shown in Fig. 3 and inserted into position to engage the pinion 18, whereupon in the present instance, the tool is shifted forwardly at a speed three-to-one of the main tool slide. Thus, by means of the present mechanism embodying a single detachable rack bar, the tool will travel two or three times as fast as the main tool slide 4 and have a greater length of movement than the main tool slide and thus may be used for deep drilling and other work requiring a long throw or feed. In practice a suitable stop (not shown) is preferably placed in position, so that during the return movement of the main tool slide the rack bar 22 will be engaged by this stop and thus positively withdraw the tool by an action exactly opposite to the working stroke of the tool. The return of the tool, however, may be accomplished partly or wholly by means of the spring 23, or a similar spring may be placed between the gauge collar 15 and the tool holder 10 for the purpose of assisting in returning the tool.

It will also be understood that any kind of a tool may be carried by this improved attachment, such as a drill, turning tool, burnishing tool, reamer, etc., where it is desired to obtain either a fast feed or an increased stroke,—it being, of course, understood that the length and position of the rack bar 22 will vary according to the nature of the work and the position of the stop for controlling it.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a metal working machine, the combination of an indexible work spindle carrier, a horizontally-shiftable main tool slide, a supplemental tool slide carried thereby, and means for feeding the supplemental tool slide at a plurality of different speeds relatively to the main tool slide and comprising a plurality of differently formed means and means adapted to co-operate in different positions with any of said means.

2. In a metal working machine, the combination of an indexible work spindle carrier, a horizontally-shiftable main tool slide, a supplemental tool slide carried thereby, and means for feeding the supplemental tool slide at a plurality of different speeds relatively to the main tool slide and comprising a plurality of differently formed means and a single detachable means adapted to co-operate in different positions with any of said means to vary the speed of the supplemental tool slide.

3. The combination of a main tool slide, a supplemental tool slide carried thereby, means for feeding the supplemental tool slide at a plurality of different speeds relatively to the main tool slide and comprising a plurality of gears having different numbers of teeth, and a single detachable rack bar adapted to co-operate in different positions with any of said gears.

4. In a metal working machine, the combination of an indexible work spindle carrier, a horizontally-shiftable main tool slide, a supplemental tool slide carried thereby, means for feeding the supplemental tool slide at a plurality of different speeds relatively to the main tool slide, and comprising a plurality of superposed gears having different numbers of teeth, and a single endwise detachable rack bar adapted to co-operate in different superposed positions with any one of said gears.

5. In a metal working machine, the combination of an indexible work spindle carrier, a horizontally-shiftable main tool slide, a supplemental tool slide carried thereby and having rack teeth, means for feeding the supplemental tool slide at different speeds relatively to the main slide and comprising a plurality of superposed gears, one thereof in mesh with the teeth of the supplemental tool slide, and a single, endwise detachable rack bar adapted to co-operate in different superposed positions with any one of said gears.

6. The combination of a main tool slide, a tool holder supported thereby, a housing carried by said tool holder, a supplemental tool slide carried by said housing, a plurality of superposed gears of different diameters supported within the housing at one side of said supplemental tool slide, said housing having its end walls provided with a plurality of pairs of openings, and a detachable rack bar passing through the openings of the housing and co-operating with one of said gears.

7. The combination of a main tool slide, a tool holder supported thereby, a housing carried by said tool holder, a supplemental tool slide carried by said housing, a plurality of superposed gears of different diameters supported within the housing at one side of said supplemental tool slide, said housing having its end walls provided with a plurality of pairs of openings, a detachable rack bar passing through the openings of the housing and co-operating with one of said gears, and means for stopping the rack bar during the movement of the main slide thereby to feed the supplemental tool holder at a different speed from the main tool slide.

8. The combination of supporting means, a tool supported thereby, means for moving said supporting means and tool together relatively to the work, gearing for shifting said tool at a plurality of different speeds and comprising superposed gears having different numbers of teeth, and a single detachable rack bar adapted to co-operate with any of said gears.

9. The combination of supporting means, a tool supported thereby, means for moving said supporting means and tool together relatively to the work, means for shifting said tool at a plurality of different speeds from that of the supporting means and comprising a plurality of differently formed means and means adapted to co-operate in different positions with any of said means, and means for reversing the tool.

10. The combination of supporting means, a tool supported thereby, means for moving said supporting means and tool together relatively to the work, gearing for shifting said tool at a plurality of different speeds and comprising superposed gears having different numbers of teeth, a single detachable rack bar adapted to co-operate with any of said gears, and means for reversing the tool.

11. The combination of a main tool slide, a supplemental tool slide carried thereby, means for moving the main tool slide and supplemental slide together relatively to the work, a plurality of gears for shifting said supplemental tool slide at different speeds relatively to the main tool slide, and single detachable means adapted to engage any one of said gears for operating the same.

12. The combination of a main tool slide, a supplemental tool slide carried thereby, means for moving the main tool slide and supplemental slide together relatively to the work, a plurality of gears for shifting said supplemental tool slide at different speeds relatively to the main tool slide, single detachable means adapted to engage any one of said gears for operating the same, and means for limiting the movement of said detachable means thereby to rotate the gears.

13. The combination of a main tool slide, a supplemental tool slide, means for moving the slides together relatively to the work, a plurality of superposed gears rotatable together, one co-operating with the supplemental tool slide, and a single detachable rack adapted to co-operate with any of said gears thereby to shift the supplemental tool slide at a speed different from that of the main tool slide.

14. The combination of a main tool slide, a supplemental tool slide, means for moving the slides together relatively to the work, a plurality of superposed gears rotatable together, one co-operating with the supplemental tool slide, a single detachable rack adapted to co-operate with any of said gears thereby to shift the supplemental tool slide at a speed different from that of the main tool slide, and means for stopping the movement of the detachable rack.

15. The combination of a main tool slide, a supplemental tool slide, means for moving the slides together relatively to the work, a plurality of superposed gears rotatable together, one co-operating with the supplemental tool slide, a single detachable rack adapted to co-operate with any of said gears thereby to shift the supplemental tool slide at a speed different from that of the main tool slide, means for stopping the movement of the detachable rack, and means for reversing the same.

16. The combination of supporting means, a pair of shiftable parallel racks carried thereby, a gear co-operating with said racks, a tool connected to one of said racks, the other being detachable, means for controlling the detachable rack to permit shiftable movement of the tool carrying rack relatively thereto at an increased speed, and a superposed gear carried by said first gear for operation by said detachable rack when withdrawn from engagement with said first gear whereby the tools may be shifted at different speeds.

17. The combination of supporting means, a pair of shiftable racks carried thereby, one detachable, a tool connected with the other rack, a gear co-operating with said racks, said tool rack and gear being movable relatively to the detachable rack to accelerate the movement of the tool, and a superposed gear carried by the first gear and in position to be engaged by the detachable rack on withdrawal thereof from engagement with the first gear whereby the movement of the tool is accelerated at a still different speed.

18. In a machine of the class described, the combination of a sliding tool carrier, a tool carried thereby and movable therewith, and means operative during substantially the entire operation of the tool on the work for increasing the movement of the tool independently of the carrier and at different speeds relatively to the carrier and comprising a plurality of differently formed means and means adapted to co-operate in different positions with any of said means.

19. In a machine of the class described, the combination of a sliding tool carrier, a tool carried thereby and movable therewith, means operative during substantially the entire operation of the tool on the work for increasing the movement of the tool independently of the carrier and at different speeds relatively to the carrier and including gears of different ratio, and a single detachable means adapted in different positions to co-operate with any of said gears.

Signed at Cleveland, Ohio, this 28th day of September, 1928.

ALFRED E. DRISSNER.